UNITED STATES PATENT OFFICE.

JOHN G. JARVIS, OF STAMFORD, NEW YORK.

NITROCELLULOSE FILM OF LOW INFLAMMABILITY.

1,354,401.  Specification of Letters Patent.  Patented Sept. 28, 1920.

No Drawing.  Application filed March 13, 1919.  Serial No. 282,499.

*To all whom it may concern:*

Be it known that I, JOHN G. JARVIS, a citizen of the United States, residing at Stamford, in the county of Delaware and State of New York, have invented certain new and useful Improvements in Nitrocellulose Films of Low Inflammability; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in a method of making nitrocellulose films of low inflammability and consists of uniting acetyl cellulose and naphthalene in suitable proportions, such as 90% of the former to 10% of the latter, and to which is added a mixture of equal parts of acetone and acetic ether sufficiently to thoroughly dissolve the mixture into a liquid, after which a solution of acetone-collodion made up of 1 ounce of nitro-cellulose to 8 fluid ounces of acetone is added to the mixture.

To the foregoing composition I add a solution of chloral hydrate or anhydrous chloral (made of 200 cubic centimeters of acetone, to 20 grams of chloral hydrate). Of this mixture of acetone and chloral hydrate 90 parts are taken for mixture with 10 parts of cinchonin or cinchonin sulfate.

Of the mixture of the acetyl cellulose, naphthalene and nitro-cellulose dissolved in acetone and acetic ether I take 85 parts and to this add 15 parts of the mixture of acetone chloral hydrate and cinchonin or cinchonin sulfate.

In carrying out my method I have found that the addition of the naphthalene will cause the liquid solvents to act more freely than without in the production of films, and while the naphthalene may not act as a solvent, it tends to improve and produce an unusually slow burning and tough film.

What I claim to be new is:

A composition for making pyroxylin sheets having the characteristic of low inflammability, consisting of nitro-cellulose and acetyl-cellulose, to which solution is added an acetone collodion and chloral hydrate with cinchonin.

In testimony whereof I hereunto affix my signature in presence of two witnesses.

JOHN G. JARVIS.

Witnesses:
 F. J. R. CLARKE,
 LILLIAN A. WOLF.